United States Patent [19]
Auphan

[11] 4,219,846
[45] Aug. 26, 1980

[54] DEVICE FOR SCANNING AND DISPLAY BY MEANS OF ULTRASONIC WAVES

[75] Inventor: Michel J. Auphan, Paris, France

[73] Assignee: U.S. Philips Corporation, New York, N.Y.

[21] Appl. No.: 943,241

[22] Filed: Sep. 18, 1978

[30] Foreign Application Priority Data

Oct. 5, 1977 [FR] France .................. 77 29935

[51] Int. Cl.² .......................... G01N 29/04
[52] U.S. Cl. ...................... 358/112; 73/626
[58] Field of Search ............ 358/112; 73/606, 607, 73/626, 628; 128/2 V, 2.05 Z

[56] References Cited

U.S. PATENT DOCUMENTS

3,919,683  11/1975  Itamura .................. 73/626

Primary Examiner—Robert L. Griffin
Assistant Examiner—Michael A. Masinick
Attorney, Agent, or Firm—Thomas A. Briody; Jack Oisher; Jack E. Haken

[57] ABSTRACT

A device for scanning and display by means of ultrasonic waves, comprising an electro-acoustic converter including a rectangular matrix of transducers. A number of switching members are adapted to select a rectangular scanning zone in the matrix, to group the transducers in the scanning zone in annular concentric configurations, and to displace the scanning zone in the longitudinal direction of the matrix.

3 Claims, 12 Drawing Figures

|      | ① | ② | ③ | ④ | ⑤ | ⑥ | ⑦ | ⑧ | ⑨ | ⑩ | ⑪ | ⑫ | ⑬ | ⑭ | ⑮ | ⑯ |
|---|---|---|---|---|---|---|---|---|---|---|---|---|---|---|---|---|
| Δt1  | 1  | 2  | 3  | 4  | 5  | 6  | 7  | 8  | 9  | 10 | 11 | 12 | 13 | 14 | 15 | 16 |
| Δt2  | 17 | 2  | 3  | 4  | 5  | 6  | 7  | 8  | 9  | 10 | 11 | 12 | 13 | 14 | 15 | 16 |
| Δt3  | 17 | 18 | 3  | 4  | 5  | 6  | 7  | 8  | 9  | 10 | 11 | 12 | 13 | 14 | 15 | 16 |
| Δt4  | 17 | 18 | 19 | 4  | 5  | 6  | 7  | 8  | 9  | 10 | 11 | 12 | 13 | 14 | 15 | 16 |
| Δt5  | 17 | 18 | 19 | 20 | 5  | 6  | 7  | 8  | 9  | 10 | 11 | 12 | 13 | 14 | 15 | 16 |
| Δt6  | 17 | 18 | 19 | 20 | 21 | 6  | 7  | 8  | 9  | 10 | 11 | 12 | 13 | 14 | 15 | 16 |
| Δt7  | 17 | 18 | 19 | 20 | 21 | 22 | 7  | 8  | 9  | 10 | 11 | 12 | 13 | 14 | 15 | 16 |
| Δt8  | 17 | 18 | 19 | 20 | 21 | 22 | 23 | 8  | 9  | 10 | 11 | 12 | 13 | 14 | 15 | 16 |
| Δt9  | 17 | 18 | 19 | 20 | 21 | 22 | 23 | 24 | 9  | 10 | 11 | 12 | 13 | 14 | 15 | 16 |
| Δt10 | 17 | 18 | 19 | 20 | 21 | 22 | 23 | 24 | 25 | 10 | 11 | 12 | 13 | 14 | 15 | 16 |
| Δt11 | 17 | 18 | 19 | 20 | 21 | 22 | 23 | 24 | 25 | 26 | 11 | 12 | 13 | 14 | 15 | 16 |
| Δt12 | 17 | 18 | 19 | 20 | 21 | 22 | 23 | 24 | 25 | 26 | 27 | 12 | 13 | 14 | 15 | 16 |
| Δt13 | 17 | 18 | 19 | 20 | 21 | 22 | 23 | 24 | 25 | 26 | 27 | 28 | 13 | 14 | 15 | 16 |
| Δt14 | 17 | 18 | 19 | 20 | 21 | 22 | 23 | 24 | 25 | 26 | 27 | 28 | 29 | 14 | 15 | 16 |
| Δt15 | 17 | 18 | 19 | 20 | 21 | 22 | 23 | 24 | 25 | 26 | 27 | 28 | 29 | 30 | 15 | 16 |
| Δt16 | 17 | 18 | 19 | 20 | 21 | 22 | 23 | 24 | 25 | 26 | 27 | 28 | 29 | 30 | 31 | 16 |
| Δt17 | 17 | 18 | 19 | 20 | 21 | 22 | 23 | 24 | 25 | 26 | 27 | 28 | 29 | 30 | 31 | 32 |

DEVICE FOR SCANNING AND DISPLAY BY MEANS OF ULTRASONIC WAVES

The invention relates to a device for scanning and display by means of ultrasonic waves, comprising an electro-acoustic converter which includes a plurality of tranducers, and also a number of switches for selectively connecting given transducers either to devices for the storage and/or the display of an image, or to an electrical signal generator in order to produce transmitted ultrasonic beams.

Systems of this kind are particularly useful for medical applications.

An example of such a device is described in French Pat. No. 2,231,016. This Specification describes an apparatus for transmitting and receiving ultrasonic waves via successive switching operations on a measuring head provided with a row of ultrasonic transducers. An ultrasonic beam can thus be focussed in one direction for the electronic scanning of an object.

The invention has for its object to enable double focussing in two mutually perpendicular directions, utilizing a minimum number of switches. The resolution of a double focussed system is substantially higher than that of existing systems.

To this end, the device in accordance with the invention comprises an electro-acoustic converter including a rectangular matrix of transducers arranged in rows and columns. The device further comprises:

a plurality of first switching members, each of which comprises switches which function to establish a connection to a consecutive group of selected transducers in a row, the position of the group within the row being variable such that all groups together constitute a rectangular scanning zone which is displaceable along the longitudinal (row) direction of the matrix;

a plurality of second switching members, each of which comprises switches, each switch functioning to interconnect two transducers in a group which are symmetrically situated with respect to the center of the group;

a plurality of third switching members, each of which comprises switches which function to connect a trandsucer pair, formed by a second switching member, to a terminal of a series, the rank of the selected terminal in the series being determined by the distance between a transducer of the pair and the center of the group;

an interconnecting member in which terminals of the same rank at each third switching member are interconnected and comprising connections between terminals of different groups, so that approximately annular configurations of interconnected transducers are formed in the scanning zone. The annular configurations are situated concentrically with respect to the center of the scanning zone, each configuration being connected to an output line from the interconnecting member.

Preferably, the device in accordance with the invention comprises a fourth switching member which includes directional couplers which connect output lines of the interconnecting member to either outputs of the generator in order to produce ultrasonic beams, or inputs of the device for the storage and/or display of an image.

In a further preferred embodiment, the connection between each output line and the generator, and also the connection between each output line and the device for the storage and/or display, comprises a delay member.

Figure 1:
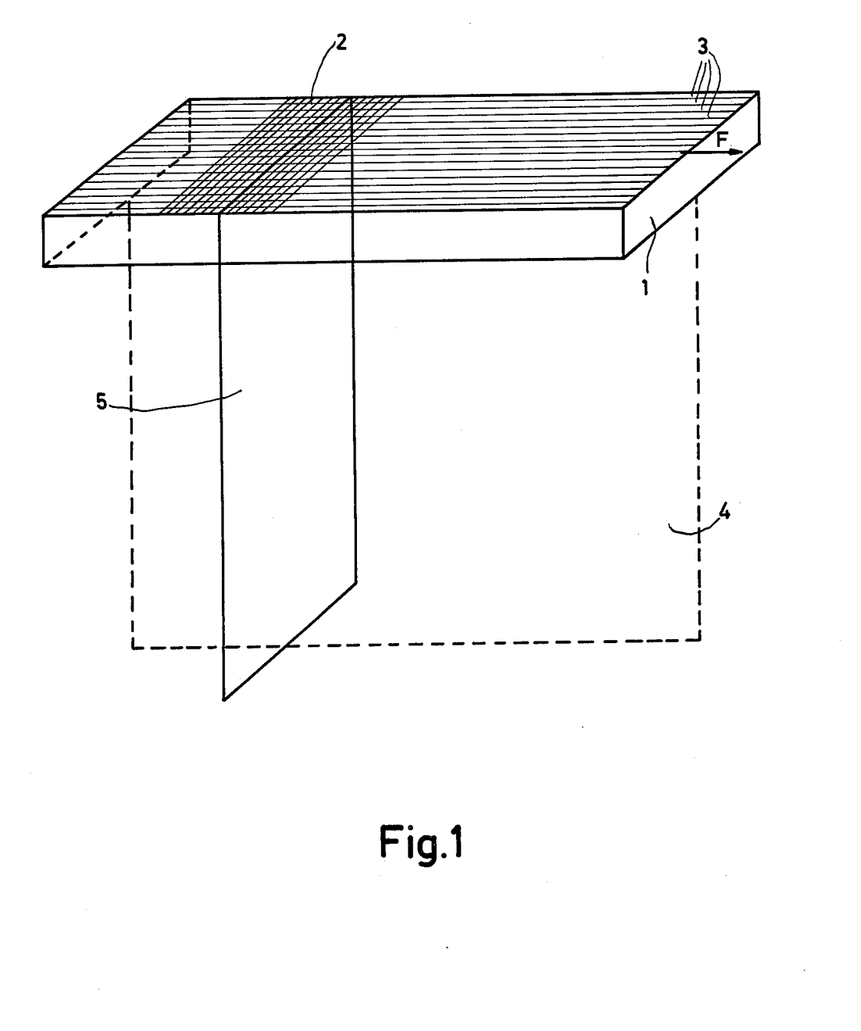
FIG. 1 is a perspective view of an electroacoustic converter of an embodiment of the device in accordance with the invention.

The invention will be described in detail hereinafter with reference to the accompanying diagrammatic drawings in which:

FIG. 1 is a two-dimensional electroacoustic converter which is commonly referred to as a "transducer matrix". This device is connected to electronic scanning and focussing members (not shown in FIG. 1).

This type of device is known per se. Therefore, the device will only be described hereinafter in as far as is necessary for understanding of the invention.

The electro-acoustic converter is formed from a plate 1 of piezo-electric material on which transducers are arranged in a number of rows 3.

These transducers may be formed by small, individually metallized surface elements which are provided on one of the main faces of the piezo-electric plate 1 (generally a plate of piezo-electric ceramic material). The other main face of the plate 1 is usually completely metallized.

Each surface element is connected to a connection wire. The number of connection wires thus equals the number of transducers. An additional connection wire is connected to the metallized rear side of the plate 1.

The electro-acoustic converter shown in FIG. 1 is shaped as a matrix of transducers, comprising n rows and m columns. This matrix has a rectangular shape (n<m).

In a preferred embodiment of the device in accordance with the invention, the matrix consisted of n=32 rows and m=144 columns, so that it contained 4608 transducers.

FIG. 1 also illustrates a scanning method.

Given regions of transducers in the matrix are connected during a time interval $\Delta t$, to electrical members which effect scanning and focussing. These regions of transducers form a scanning zone in the matrix. During a first time interval $\Delta t_1$, a scanning zone 2 consists of a first rectangular region in FIG. 1. Only the transducers in zone 2 are active during the time interval $\Delta t_1$. Subsequently, during the next time interval $\Delta t_2$, the scanning zone is formed by an equally large second rectangular region, which is displaced from the first zone 2 by distance of one column in the direction of the arrow F (which arrow represents the scanning axis and is parallel to the longitudinal direction of the matrix).

As a result of successive displacement the scanning zone 2 is displaced across the entire surface of the matrix in a period T, the duration of which amounts to, for example, of from 60 to 80 ms. This procedure is repeated during subsequent periods T.

A scanning plane 4 extends parallel to the longitudinal direction of the matrix and hence to the scanning axis, the scanning plane dividing the matrix into two equal parts.

Plane 5 is a symmetry plane of the scanning zone, perpendicular to the scanning axis.

In said preferred embodiment of the invention, the scanning zone 2 consisted of n'=32 rows and m'=32 columns of transducers. The transducers arranged in one row in the scanning zone form a consecutive group, all groups together forming a closed rectangular region.

Figure 2:
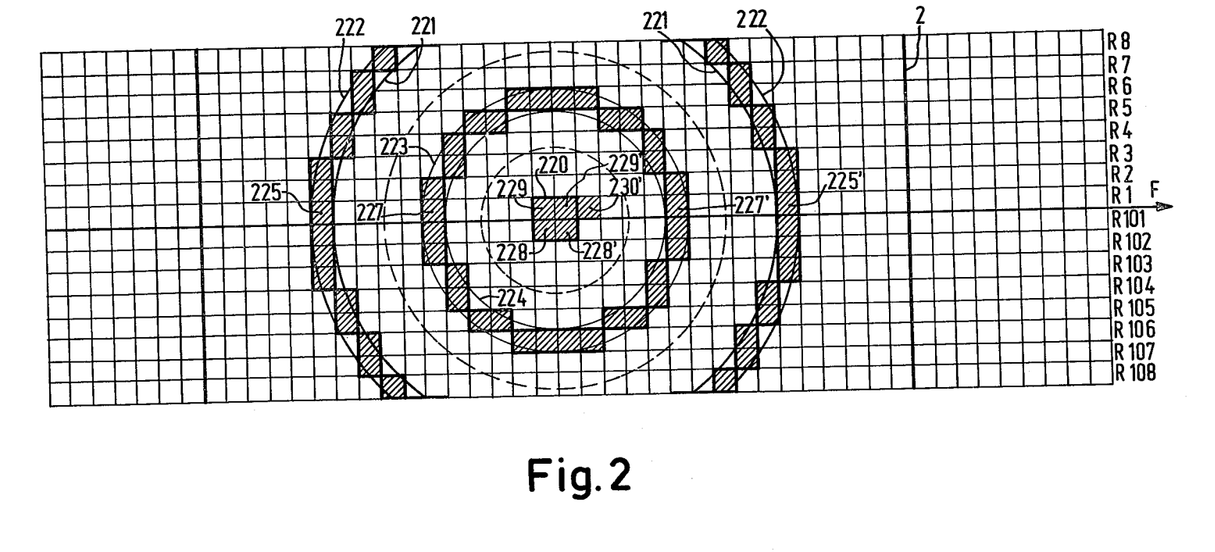
FIG. 2 is a plan view of a part of the converter shown in FIG. 1.

FIG. 2 illustrates the focussing method used.

In order to simplify the explanation of the method, FIG. 2 shows a matrix, or a part of a matrix, which comprises only 16 rows of transducers (R1 ... R8 and R101 ... R108).

Each square of said matrix represents one transducer. Focussing is realized by grouping the transducers in concentric focussing configurations. According to a known principle, focussing requires the use of transducers arranged in the form of concentric rings.

Because the transducer matrix is in this case formed by square transducers, a pure annular shape is approximated. FIG. 2 shows concentric circles and arcs of a circle which bound rings or parts of rings the rings are approximately circular and consist of the shaded transducers. Focussing is realized in the same manner as with transducers arranged in a pure annular arrangement; the efficiency of focussing is approximately the same. Arcs of a circle 221 and 222 bound the outer focussing ring. Square 220 forms an approximation of a central disc in a system of annular transducers. Square 220 must not only transmit ultrasonic pulses, but must also receive echo pulses. An intermediate ring of transducers is bounded by the circles 223 and 224. All these rings together form a concentric focussing configuration.

At any instant, the focussing configuration is situated within the scanning zone 2 which is displaced in the direction of the arrow F. In order to make otpimum use of the area of the moving scanning zone, it is advantageous to utilize a few complete rings in the central part of the scanning zone and also a given number of arcs of a circle which only bound ring parts in the remaining part of the scanning zone.

FIG. 2 also shows the method of interconnecting the transducers by switching members which will be described with reference to the following figures. The transducers are connected in a given manner during a time interval $\Delta t_1$ for the formation of the concentric focussing configurations. Subsequently, during the next time interval $\Delta t_2$, the transducers are grouped in a different manner in order to form a different concentric focussing configuration. Hereinafter, the interconnection of the transducers during the interval $\Delta t_1$ will be described per row.

In the row R1, the transducers 225 and 225' are interconnected by switching members which will be described. This is also the case for the transducers 227 and 227' and for the transducers 229 and 229'.

In general, all transducers belonging to the same ring or the same ring part are interconnected during the interval $\Delta t_1$ (for example, the transducers 229 and 229', 228 and 228'): During the interval $\Delta t_2$, the scanning zone 2 displaced over a distance of one or more columns. During interval $t_2$ the same concentric focussing configurations are formed as during the interval $\Delta t_1$. These configurations are displaced over the same distance as the scanning zone 2. Thus, the scanning zone is gradually displaced across the entire length of the matrix.

The switching members establish connections between selected transducers of one and the same row (for example, between the transducers 229 and 229' during the interval $\Delta t_1$). Via permutation of the connections (229 becomes, for example, 229' and 229' becomes 230'), it is possible to displace the scanning zone 2. Subsequently, interconnections are established between the connections of transducers of different rows. Thus, the focussing rings are formed. For example, the transducers 229 and 229' of the row R1 are connected to the transducers 228 and 228' of the row R101, etc. For establishing the connections, use can thus be made of the symmetrical position with respect to the symmetry plane 5. Unless otherwise stated, the reference numerals of the transducers will be provided with an accent when transducers are concerned which are situated to the right of the symmetry plane 5, while no accent is provided when the relevant transducers are situated to the left of the symmetry plane.

For realizing the interconnections, use can also be made of the symmetry of the transducers situated on both sides of the scanning plane 4 (see FIG. 1).

Figure 3:
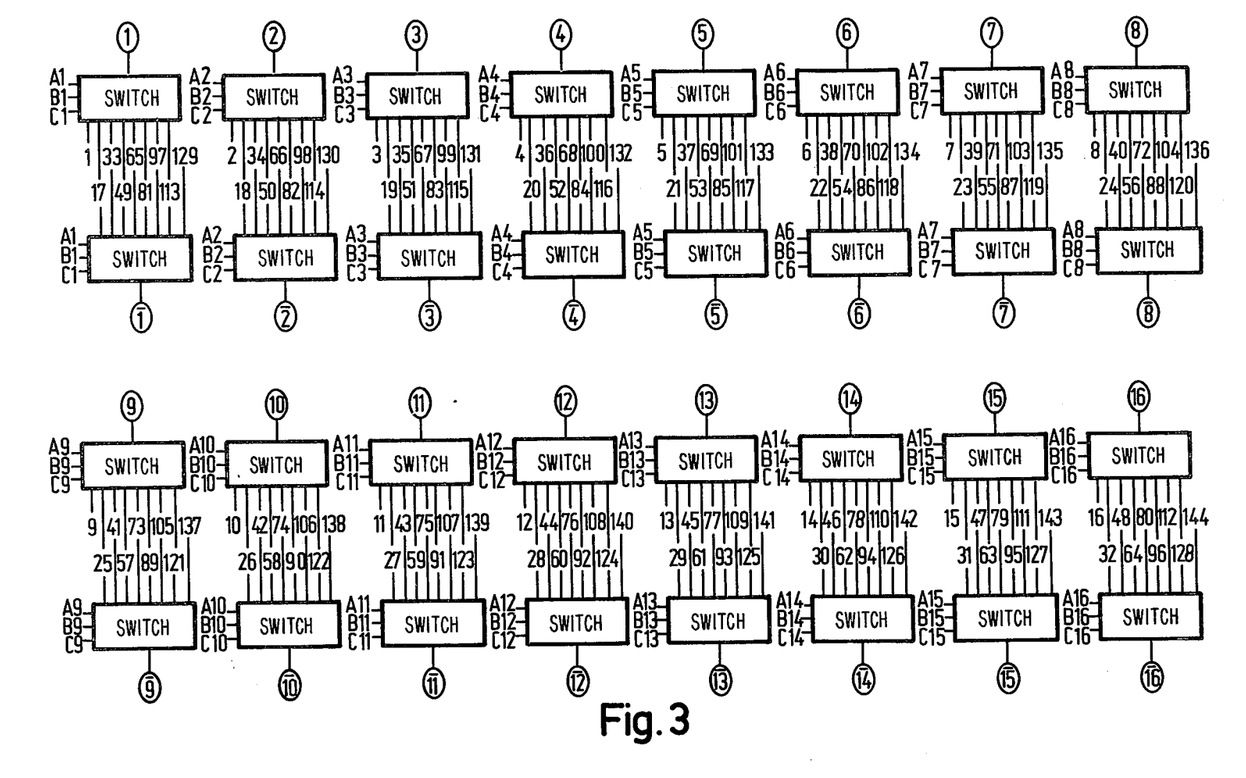
FIG. 3 is a first switching member.

FIG. 3 shows a first switching member, formed by switches which establish, via permutations, the connections to the transducers of a row (for example, the row R1) which are situated inside the scanning zone and which form a group. The diagram of FIG. 1 is intended for the described embodiment of the matrix (n=32, m=144). The scanning zone 2 in this embodiment forms a square region of 32×32 transducers.

The switching member shown in FIG. 3 comprises 32 analog multiplex switches (for example, of the type HEF 4051B made by N. V. Philips Eindhoven, The Netherlands). Each of these switches comprises 8 selection inputs, one common input, and three control terminals. The switches are preferably bi-directional switches, which means that they conduct signals from the common input to one of the selection inputs as well as vice versa. The switches are grouped in pairs, so that the selection inputs of one pair of switches are connected to nine transducers. The 32 switches are thus connected to the 32/2×9=144 transducers of one matrix row.

Figure 4:
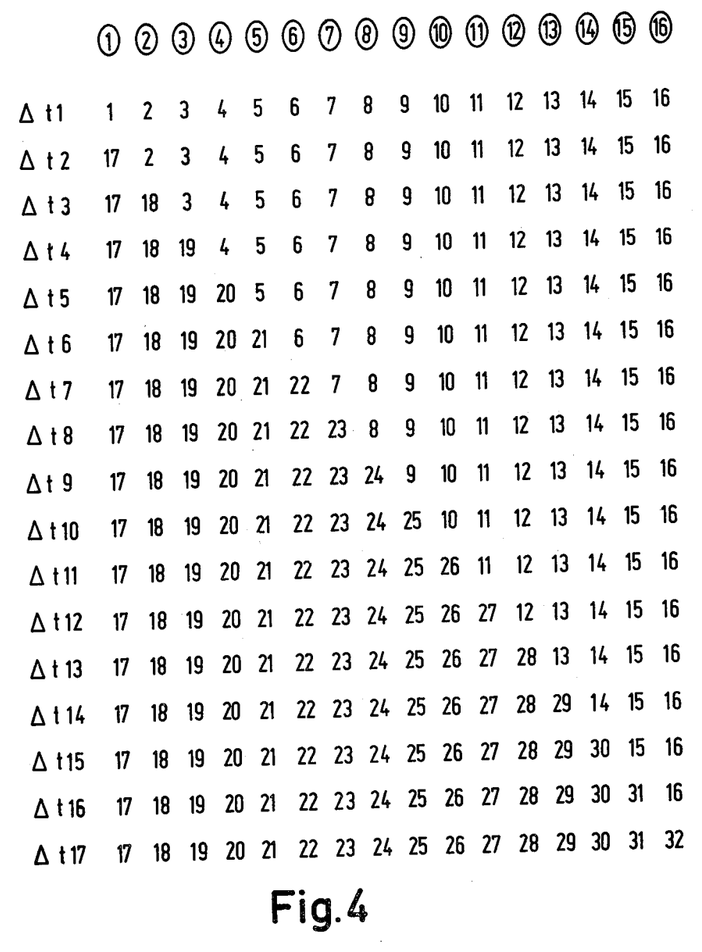
FIG. 4 is a table to which illustrates the operation of the first switching member.

The operation of the first switching member is as follows: during an interval $\Delta t$, the common input ① to ⑯, or ① or ⑯, of each switch is connected to one of the selection inputs of this switch, so that the 32 common inputs are always connected to 32 consecutively numbered transducers, be it that the sequence of the transducer numbers need not be the same as that of the numbers of the common inputs. These 32 transducers thus form a closed group. This is illustrated in the Table of FIG. 4 for the intervals $\Delta t_1$ to $\Delta t_{17}$. The Table only indicates which transducers are each time connected to the common inputs ① to ⑯. The transducer connected to a common input ⓧ can be found adding 16 to the number of the transducer connected to the common input ⓧ (x=1 to 16).

FIG. 3 shows that the numbers of two transducers of the matrix, connected to two successive switching terminals, differ by 16. The selection inputs of the switches having the common input ①, for example, are connected to the transducers 1, 17, 33, 49, 65, 81, 97, 113, 129.

In the present embodiment, the dimensions of the matrix are 144×32. Therefore 32 first switching members as shown in FIG. 3 are required for establishing all connections to the transducers of the 32 rows.

These 32 first switching members thus comprise a total of 144×32=4608 selection inputs, and 1024 (32×32) common inputs. The transducers connected to these common inputs during an interval Δt form the scanning zone.

The selection input of a switch which is connected to the common input is determined by the control signals on the control terminals A, B and C of this switch. These control signals are binary signals which are generated by a control member, shown in FIG. 9, the operation of which will be described in detail hereinafter.

Summarizing, the first switching members determine which transducers form part of the scanning zone at any instant. The sequence of the transducers does not always correspond to the sequence of the common terminals to which they are connected.

Figures 5, 9:
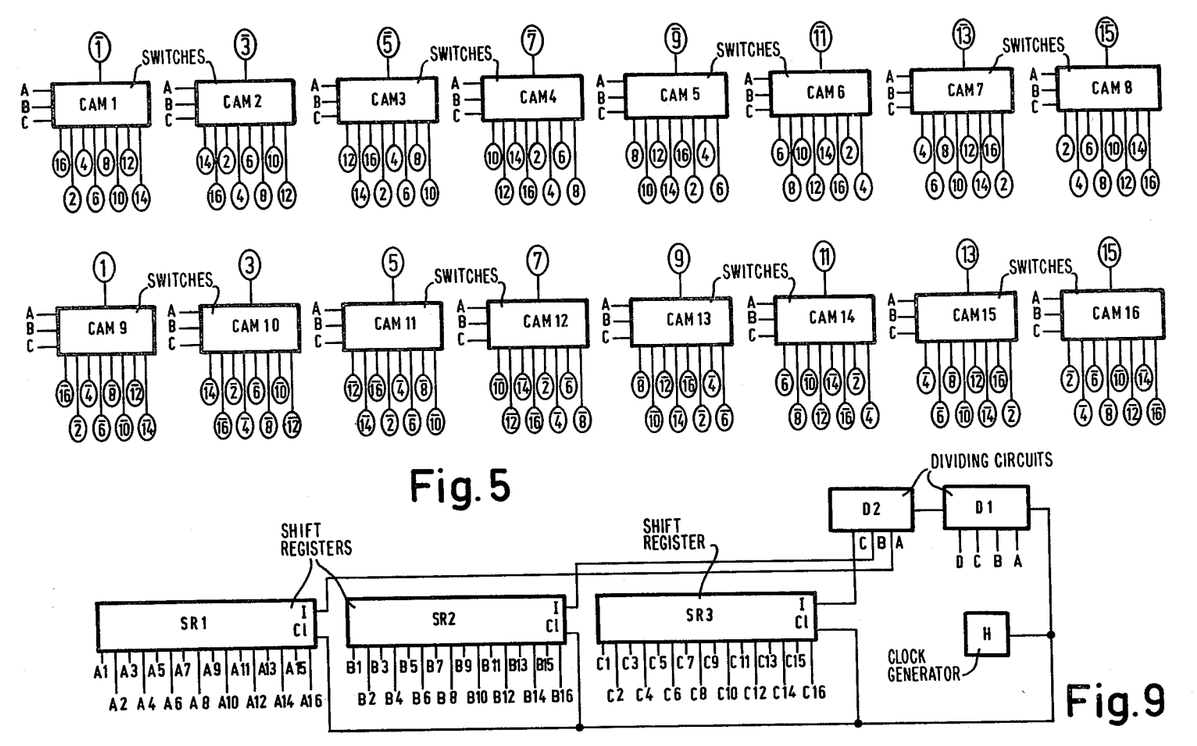
FIG. 5 is the structure of a second switching member.
FIG. 9 is a control member.

A number of second switching members, an embodiment of which is shown in FIG. 5, serve to establish connections between transducers situated in the scanning zone, symmetric with respect to the symmetry plane 5 of this zone. These connections are established between common inputs of the first switching members, which are connected to the transducers of the matrix in a non-ordered manner, as has already been mentioned.

The second switching member shown in FIG. 5 comprises 16 analog multiplex switches CAM1 to CAM16, the selection inputs of which are connected, in the manner shown in the Figure, to the common inputs which bear an even number of the switches of the first switching member. For example, the common input $\overline{16}$ of the first member is connected to a selection input of the switches CAM9, 10, 11, 12, 13, 14, 15 and 16. However, the common inputs of the first member which bear an odd number are connected directly to the common inputs of the switches CAM of the second member in the manner shown in FIG. 5.

Figure 6:
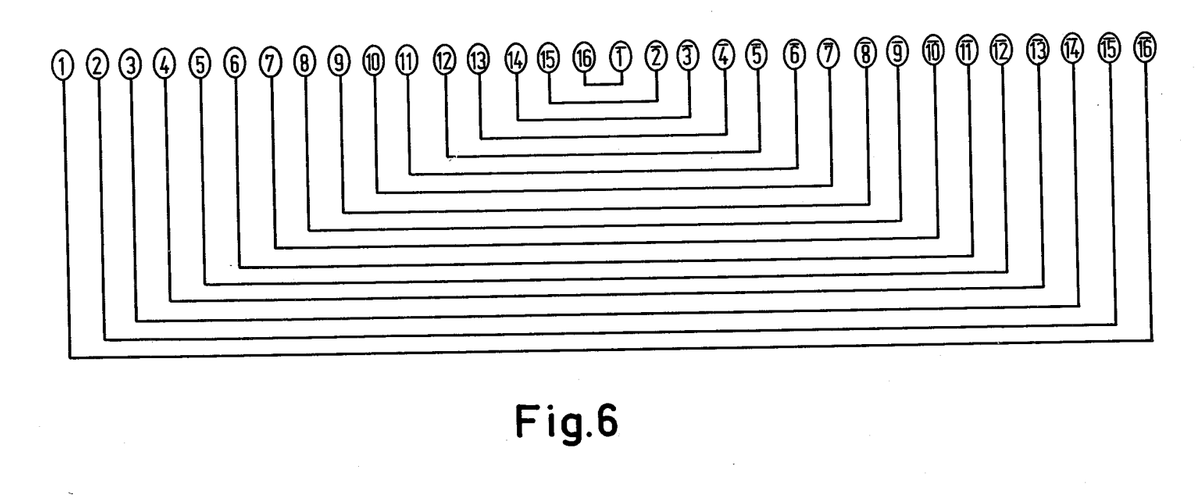
FIG. 6 is a table illustrating the operation of the second switching member.

FIG. 6 shows an example of the connections which can be established between the common inputs of the first member by the second member.

Figure 7:
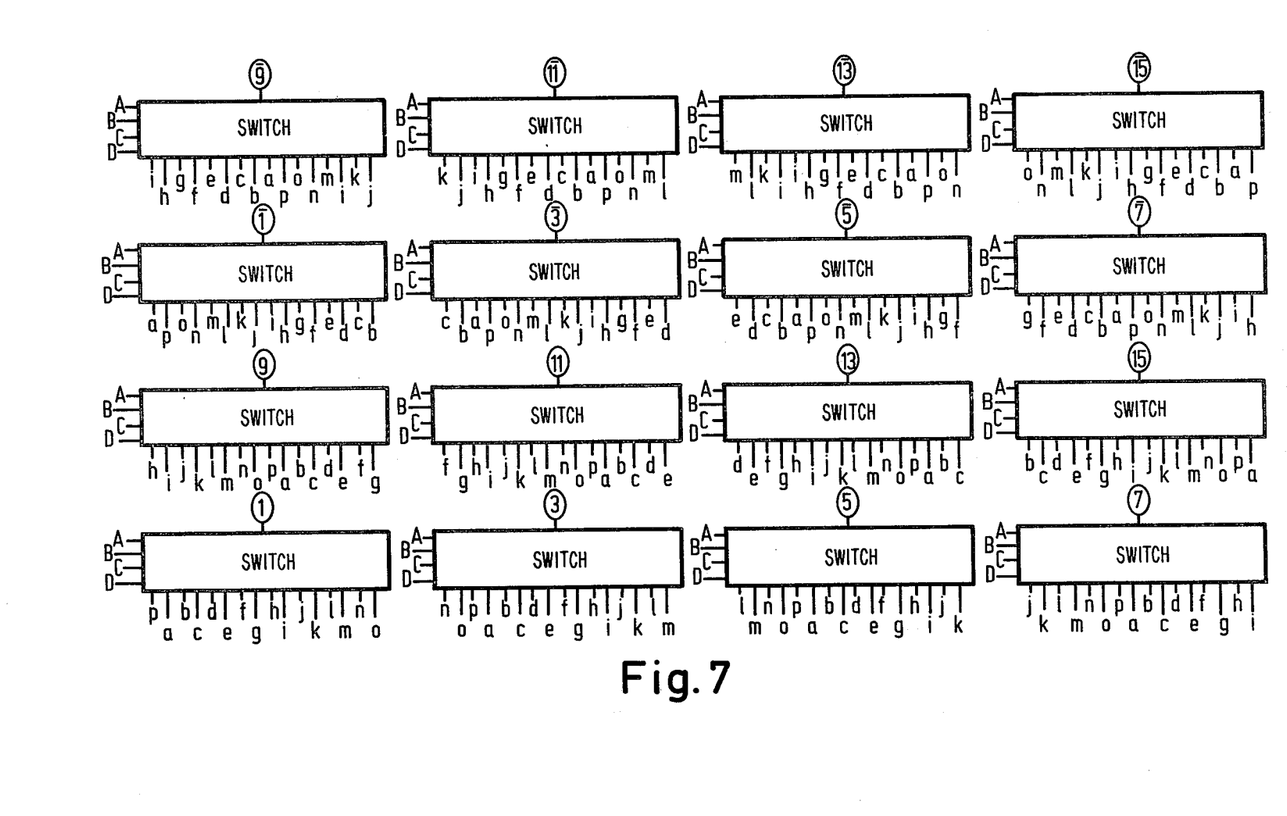
FIG. 7 is the structure of a third switching member.

In general the second switching member connects each common input which bears an odd number of the first member to a common input bearing an even number, so that the two transducers thus interconnected are symmetrically situated with respect to the symmetry plane 5 of the scanning zone. Obviously, other connections must be established in another time interval Δt, which is again realized by the changing of the combination of control signals on the control terminals A, B, C. Connections are thus established, on the common inputs of the second switching members row per row, to transducers which are symmetrically situated in the scanning zone with respect to the central plane 5 of this zone. These connections betwen transducers are established in a non-ordered manner (i.e. the sequence of the transducers need not correspond to the sequence of the common inputs). This is because the common inputs $\overline{1}$ and $\overline{16}$ do not necessarily correspond to adjacent transducers. Therefore, third switching members as shown in FIG. 7 are required. These third switching members serving to restore the sequence of the connections between the permutated, symmetrical transducers. The connections can thus be ordered in a sequence from the outer transducers to the inner transducers of the scanning zone, or vice versa.

The third switching member (shown in FIG. 7) is also formed by mutually identical, switches such as used for the switching members shown in the FIGS. 3 and 5; they are controlled in the same manner by the control member yet to be described. Each of the switches used to form the third switching member preferably comprises 16 selection inputs. Alternatively, the number of selection inputs per switch can be reduced by increasing the number of switches used.

The selection inputs of the 16 switches forming the third switching member are denoted by lower case letters (FIG. 7). The third switching member enables the input $\widehat{x}$ or $\widehat{\overline{x}}$, corresponding to the centrally situated transducers of the scanning zone, to be connected to selection terminal a, and subsequently ever further outwards situated transducer pairs to be successively connected to the selection terminals b, c, d, . . . until the outermost transducers are connected to the selection terminal p.

The common input terminals of the switches of the third switching member are connected, as appears from FIG. 7, to the non-ordered common inputs of the second switching member which bear an odd number. The connections A, B, C, D of the switches of the third members receive, like the control inputs of the second and first members, control signals which originate from the control member to be described hereinafter.

Figure 8:
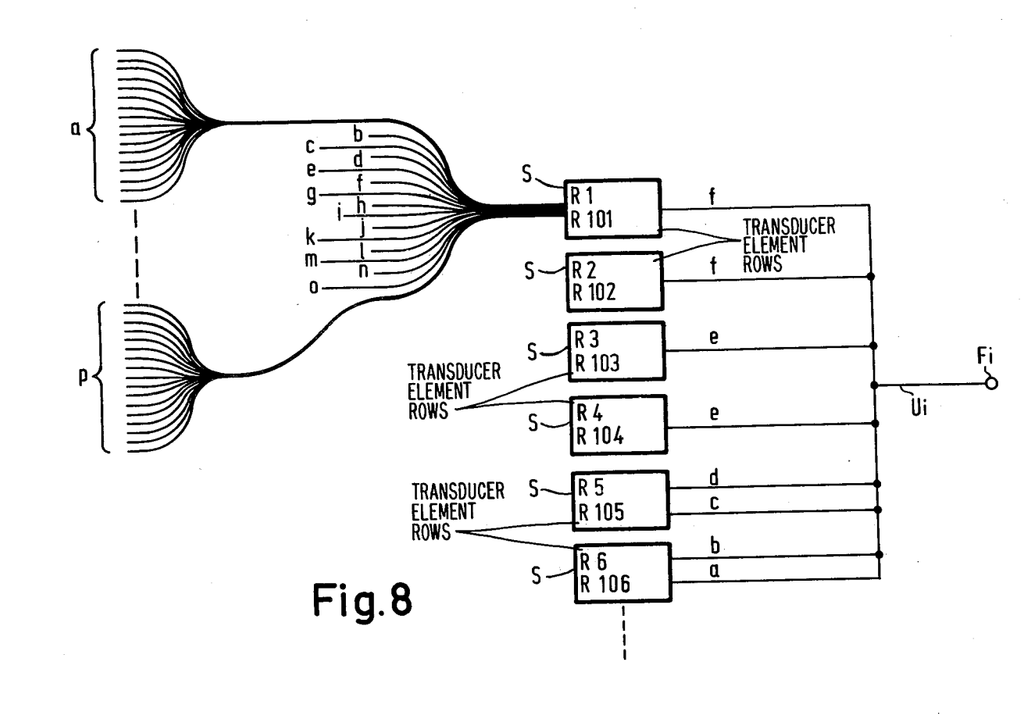
FIG. 8 is the structure of an interconnecting member.

FIG. 8 shows an interconnecting member in which all 16×16 connections "a", "b", . . . "p", originating from a preceding third switching member and corresponding to transducers situated in one and the same row (for example, the row R1) of the matrix come together. This interconnecting member reduces all said connections "a" to "p" to 16 connections by interconnecting connections provided with the same letters "a", "b" . . . "p".

It is to be noted that a network comprising a first switching member, a second switching member and a third switching member is not only capable of establishing the required connections between and to the transducers of one and the same row of the matrix, but taking into account the symmetry with respect to the scanning plane can also provide the connections to the transducers of a second row (for example, the rows R1 and R101 as shown in FIG. 2), provided that both rows are symmetrically situated with respect to the plane 4 of the matrix. Therefore, when a direct connection is provided between the transducers of two rows which are symmetrically situated with respect to the scanning plane, 16 networks of first, second and third switching members suffice for scanning and focussing the ultrasonic waves transmitted by a matrix comprising 32 rows. These 16 networks, each of which comprises 16 connections which are denoted by the letters "a" to "p" are interconnected once more in the interconnecting member in order to form the concentric focussing configurations described with reference to FIG. 2. To this end, the interconnecting member comprises 16 selection members S, one for each pair of associated rows, such as R1 and R101. Each of these selection members can connect one or more of the connections a to p to one of a number of output lines such as Ui. For example, 7 concentric focussing configurations can be formed, denoted by F1 to F7, for which 7 output lines U1 to U7 are required.

Considering the concentric focussing configurations shown in FIG. 2, notably the ring which is bounded approximately by the circles 223 and 224, the interconnection formula for the transducers of the scanning zone forming this ring can be readily found. In order to clarify the notations, it may be stated that the interconnection between, for example, the four transducers 229–229'–228'–228 of the rows R1 and R101 (symmetrical with respect to the planes 4 and 5 of FIG. 1), is denoted by aR1. According to this notation, the formula Fi determining the connections of the transducers belonging to the ring between the circles 223 and 224 is: Fi: {aR6+bR6+cR5+dR5+eR4+eR3+fR2+fR1}; (the + sign symbolizes an interconnection via the output line Ui). The interconnections which are symbolized by the formules Fi and which define the composition of the concentric configuration F1 are shown in FIG. 8.

During each time interval $at_1$ the focussing can be realized by means of focussing rings which correspond approximately to the concentric focussing configurations F1 ... Fi ... i.e. during transmission as well as during reception of the echo signals, since the analog multiplex switches can operate in both directions. To this end, this network should be connected to a transmitter/receiver and also to the control member. This control member, shown in FIG. 9, generates a number of binary control signals which enable control of the switches.

A central clock generator H supplies pulses having a given fixed frequency which may amount to, for example, a few MHz. The four outputs of a first dividing circuit D1 (which divides by 16) supply the binary signals which enable control of the switches CAM of the third switching members. After that, the divided clock signal is applied to a second dividing circuit D2 (which divides by 8), the three output signals A, B and C of which are applied to the inputs I of three shift registers SR1, SR2 and SR3, and to the control connections of the second switching members. Each of the three shift registers SR1, SR2, SR3 comprises 16 outputs on which the 48 signals A1, B1, C1 etc. ... A16, B16, C16, for controlling the first switching members appear. The clock input (C1) of the shift registers SR1, SR2 and SR3 is connected to the central clock generator H.

Figure 10:
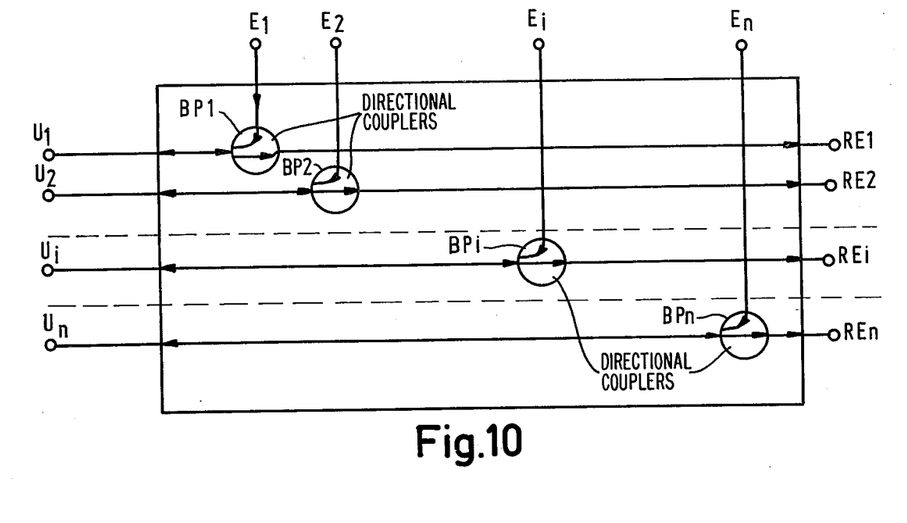
FIG. 10 is a fourth switching member.

FIG. 10 shows a fourth switching member. This member electrically either connects generators for generating the electrical signals for producing the transmitted ultrasonic beams to the connections of the selected transducers, or connects these connections to devices for storing and/or reproducing the ultrasonic image received. To this end, the fourth switching member is connected on the one side to the output lines U1 to Un of the interconnecting member, and on the other side to a transmitter and a receiver. The terminals which are connected to the transmitter are denoted by the references $E_1, E_2 \ldots E_i \ldots E_n$, the terminals connected to the receiver (devices for storing and/or displaying the received ultrasonic image) being denoted by RE1, RE2, ... REi ... REn.

The fourth switching member is mainly formed by directional couplers BP1, BP2, ... BPi, ... BPn. These directional couplers form connections which conduct signals only in the direction denoted by arrows in FIG. 10. Thus, the terminals $E_1, E_2, \ldots Ei, \ldots En$ represent signal inputs for the fourth switching member, whilst the terminals RE1, RE2, ... Rei ... REn form output terminals. The directional couplers BP1, BP2, ... BPn may be formed in different manners. For example, they may consist of switches, because the transmitted signals and the received signals are transmitted during different time intervals. Other known directional couplers can also be used within the scope of the invention.

Transmission signals are thus transmitted to transducers of the matrix, via networks of first, second and third switching members, in order to generate ultrasonic waves. These waves are reflected by different obstacles or due to differences in the refractive indices of media wherethrough the waves pass; the resulting echo signals are intercepted by the same transducers which then serve as receive transducers.

Figure 11:
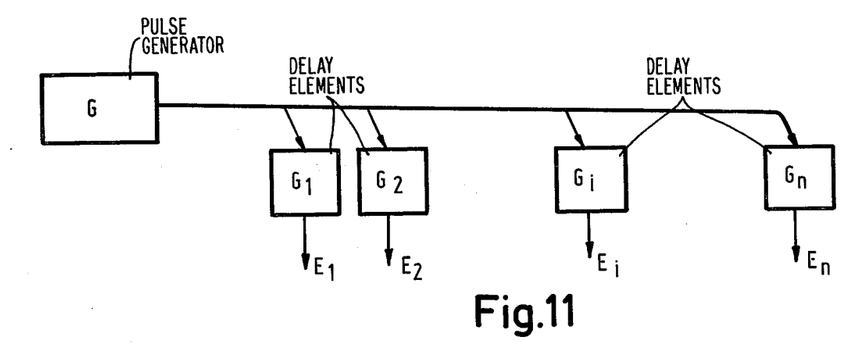
FIG. 11 is a generator for generating electrical signals which serve to produce transmitted ultrasonic beams.

FIG. 11 illustrates a preferred embodiment of a generator for generating electrical signals intended for producing the transmitted ultrasonic beams (transmitter). This transmitter is of a known construction and serves to realize pre-focusing of the signals on the transmission side. A pulse generator G produces pulse series having a frequency of some MHz. These pulses are subjected to different progressive delays in delay elements G1, G2, ... Gi ... Gn. The output terminals of each delay element Gi is connected to the corresponding input terminal Ei of the fourth switching member. A first pulse, not delayed, thus appears on the output terminal of the first delay circuit (E1), said pulse being applied to the concentric configuration F1 in the center of the scanning zone 2. Subsequently, the next pulse appears (delay 1) on the second terminal (E2), and so on until the pulse which has been delayed most arrives on the terminal n (En) (delay n) in order to be transferred to the concentric configuration Fn which is furthest removed from the centre.

The progressiveness of the delays is such that proportionality exists between the delays and the mean radii of the focussing rings, the shape of which is approximated within the scope of the invention by the concentric focussing configurations. The number of delay elements, obviously, at the most equals the number of concentric focussing configurations. However, depending on the desired quality of focussing, one and the same delay element, for example, the element G1, can be connected to two (or more) concentric configurations F1, F2, ..., so that the number of delay elements is reduced.

Figure 12:
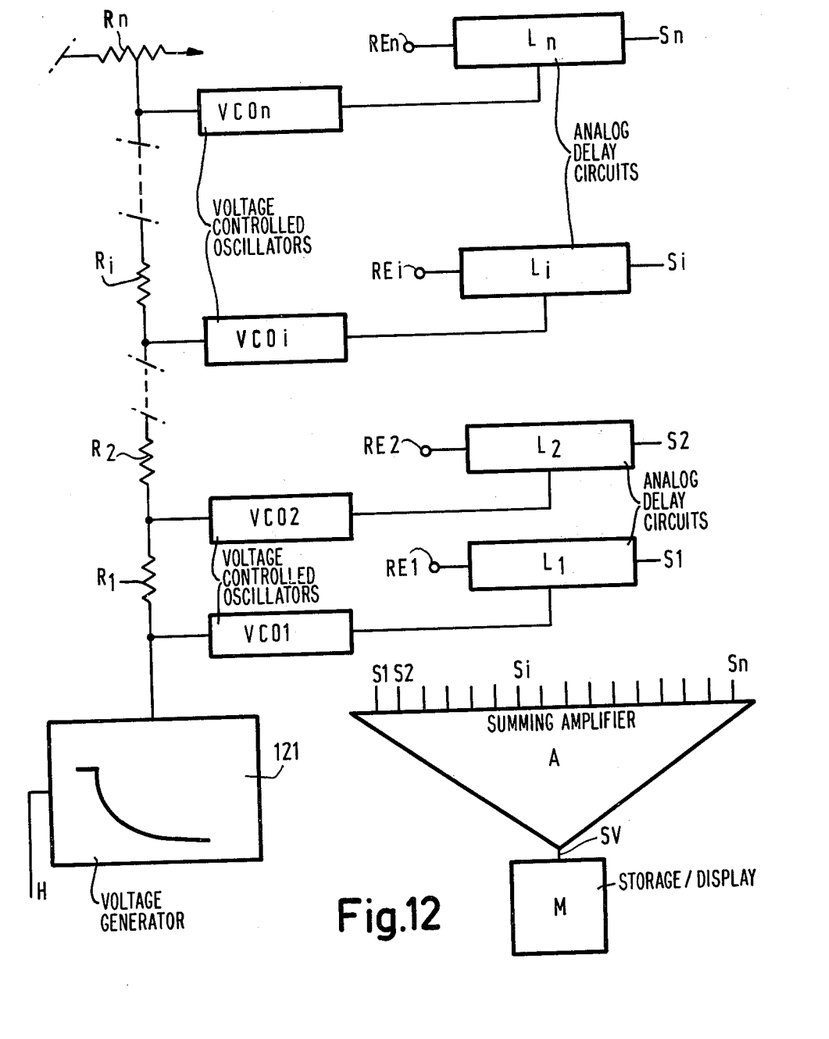
FIG. 12 is a device for processing received signals.

FIG. 12 shows a signal processing member. This member comprises a number of analog delay circuits $L_1, L_2, \ldots L_i, \ldots L_n$, for example, circuits of the type commonly referred to as PCCD's or CCD's.

The input of each delay circuit Li is connected to at least one of the terminals RE1, RE2, ... Rei, ... REn of the fourth switching member. Thus, the inputs of the delay circuits Li receive the signals Fi from the output lines Ui of the interconnecting member. Obviously, more than one signal Fi can be applied to one delay circuit Li, for example, as described for the connecting of the transmitter to the inputs E1, E2, ... Ei, ... En. Thus, the number of n delay circuits Li can be reduced.

All outputs of the delay circuits Li are connected to the inputs S1 to Sn of a summing amplifier A. This amplifier thus sums the echo signals delayed by the circuits Li. The signal obtained as a result of this summing operation constitutes the video signal SV which can be applied to a device M for storing and/or displaying the ultrasonic image received. The signal SV thus represents the ultrasonic image of an object examined by means of the device. The delays introduced by the delay circuits Li are approximately proportional to the square of the mean radii of the focussing rings, the shape of which is approximated by the concentric focussing configurations. They can be varied after each transmission by what is commonly referred to as "tracking focussing".

FIG. 12 also shows a device for producing control signals for the delay circuits Li. This device comprises a voltage generator 121 which is periodically activated by pulses originating from the clock generator H and which produces voltage signals which vary in the time in accordance with a given function L(t), for example, according to C/t (C=constant). These voltage signals are applied to n voltage controlled oscillators VCO1, VCO2, VCOi . . . VCOn. The selected functions L(t) will be dependent of the input characteristics of the oscillators VCOi. These oscillators can supply, for example, a delay signal which is proportional to the voltage. The resistors R1, R2, Ri . . . Rn provide distribution of voltage signals to the n oscillators VCOi.

The signal SV can simply be applied to a display device M of a customary type, for example, a television monitor, in as far as the scanning speed of the scanning zone 2 is adapted to the standardized properties of the monitor. This scanning speed is dependent on the frequency of the clock generator H.

What is claimed is:

1. A device for scanning and display by means of ultrasonic waves comprising:

a rectangular matrix of electro-acoustic transducers disposed in rows and columns;

first switching means which function to establish connections between a group of consecutive transducers within each of the rows and corresponding groups of first common input terminals, the position of the groups of transducers within the rows being variable such that all groups together constitute a rectangular scanning zone which is displaceable along the rows of the matrix;

second switching means comprising a plurality of switches, each of the switches functioning to interconnect a pair of the first common input terminals, the terminals in the pairs being selected so that the second switch means function to interconnect pairs of transducers within each group which are symmetrically situated with respect to the center of that group;

third switch means which function to connect groups of the interconnected first common input terminals to selected second terminals, the second terminals being arranged in ranks, the connections being established so that each transducer pair is connected to a second terminal whose rank corresponds to the distance between the transducers of the pair and the center of the zone;

interconnecting means which include a plurality of output lines and which function to interconnect second terminals of the same rank to form approximately annular configurations of interconnected transducers within the scanning zone, each annular configuration being further connected to a separate output line of the interconnecting means;

means for generating electrical signals which produce ultrasonic beams from the transducers;

means for storage and/or display of an image; and means for selectively connecting the output lines of the interconnecting means to the means for generating or to the means for storage and/or display.

2. A device as claimed in claim 1 wherein the means for selectively connecting include a plurality of directional couplers.

3. A device as claimed in claim 2 further comprising a plurality of delay elements functionally connected between an output line of the interconnecting means and the means for generating as well as between each output line and the means for storage and/or display.

* * * * *